(12) United States Patent
Kirchner et al.

(10) Patent No.: US 10,871,810 B2
(45) Date of Patent: Dec. 22, 2020

(54) POWER SUPPLY SYSTEM WITH PULSE MODE OPERATION

(71) Applicant: TEXAS INSTRUMENTS INCORPORATED, Dallas, TX (US)

(72) Inventors: Joerg Kirchner, Mauern (DE); Stefan Dietrich, Freising (DE); Julian Becker, Freising (DE); Eduardas Jodka, Freising (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/107,128

(22) Filed: Aug. 21, 2018

(65) Prior Publication Data

US 2020/0064893 A1 Feb. 27, 2020

(51) Int. Cl.
*H02M 3/156* (2006.01)
*G06F 1/26* (2006.01)
(Continued)

(52) U.S. Cl.
CPC .............. *G06F 1/26* (2013.01); *H02M 3/07* (2013.01); *H02M 3/156* (2013.01); *H02M 2001/0003* (2013.01)

(58) Field of Classification Search
CPC ............ H02M 3/00; H02M 3/02; H02M 3/04; H02M 3/06; H02M 3/07; H02M 3/10; H02M 3/145; H02M 3/155; H02M 3/156; H02M 3/1563; H02M 3/157; H02M 3/158; H02M 3/1588; H02M 3/1582;
(Continued)

(56) References Cited

U.S. PATENT DOCUMENTS

| | | | |
|---|---|---|---|
| 6,972,548 B2 * | 12/2005 | Tzeng | H02M 1/15 323/282 |
| 7,408,333 B2 * | 8/2008 | Chen | H02M 3/157 323/282 |

(Continued)

FOREIGN PATENT DOCUMENTS

| | | |
|---|---|---|
| GB | 2535100 A | 8/2016 |
| KR | 20130035242 A | 4/2013 |

OTHER PUBLICATIONS

PCT International Search Report dated Nov. 21, 2019.

*Primary Examiner* — Thienvu V Tran
*Assistant Examiner* — Carlos O Rivera-Perez
(74) *Attorney, Agent, or Firm* — Lawrence J. Bassuk; Charles A. Brill; Frank D. Cimino

(57) ABSTRACT

A power supply system can include at least one power switch to generate an output current based on an input voltage in response to a switching signal to generate an output voltage. A feedback system generates a feedback current based on the output voltage. A mode detector generates a control current associated with the output current based on the feedback current and selects between a pulse-width modulation (PWM) mode and a pulse mode based on an amplitude of the control current. The PWM mode is associated with a sequential on-time and off-time of the at least one power switch, and the pulse mode is associated with adding an idle time between the on-time and the off-time of the at least one power switch based on the switching signal. A gate driver system generates the switching signal based on the mode.

15 Claims, 5 Drawing Sheets

(51) Int. Cl.
*H02M 3/07* (2006.01)
*H02M 1/00* (2006.01)

(58) Field of Classification Search
CPC . H02M 2001/0003; H02M 2001/0009; H02M 2001/0016; H02M 2001/0025; H02M 2001/0032; H02M 2001/0038; H02M 2001/0041; H02M 3/135; H02M 3/137; H02M 3/139; H02M 3/142; H02M 2001/0029; H02M 2001/0035; H02M 2003/1552; H02M 2003/1566; H02M 1/14; H02M 1/15; G06F 1/10; G06F 1/24; G06F 1/26; G06F 1/30; G06F 1/46; G06F 1/461; G06F 1/462; G06F 1/56; G06F 1/561; G06F 1/562; G06F 1/565; G06F 1/575; G06F 1/59; Y02B 70/1458; Y02B 70/1466; Y02B 70/16; Y02B 70/10
USPC ........ 323/222–226, 234, 265, 271–275, 277, 323/280–286, 299, 311–317, 351; 363/19, 21.01, 21.09, 21.11, 21.17, 21.18, 363/23, 25, 26, 28, 41, 74, 76, 78, 79, 363/106, 123, 124; 332/106, 108, 109, 332/110, 112, 113, 115–117, 119, 120, 332/126; 375/237–239
See application file for complete search history.

(56) References Cited

U.S. PATENT DOCUMENTS

| | | |
|---|---|---|
| 8,253,407 B2 | 8/2012 | Chen et al. |
| 8,587,283 B2 | 11/2013 | Wu |
| 2015/0091544 A1* | 4/2015 | Jayaraj ................. H02M 3/156 323/284 |

\* cited by examiner

POWER SUPPLY SYSTEM WITH PULSE MODE OPERATION

TECHNICAL FIELD

This disclosure relates generally to electronic systems, and more specifically to a power supply system with pulse mode operation.

BACKGROUND

Power supply circuits can be implemented in a variety of different ways. Examples of power supply circuits include synchronous rectifier power converters, asynchronous rectifier power converters, resonant power converters, and any of a variety of other types of switching power converters. Some power supply circuits implement continuous conduction mode during both light load and heavy load conditions, while other power supply circuits implement discontinuous conduction mode in light load condition, such that the power supply circuit can stop switching at zero inductor current. Such discontinuous conduction mode can have a low output voltage ripple, but can introduce inefficiencies in generating the output voltage based on continuous switching at low current. Alternative topologies have been designed to increase efficiency, but typically at the expense of larger output voltage ripple.

SUMMARY

One example includes a power supply system. The power supply system can include at least one power switch to generate an output current based on an input voltage in response to a switching signal to generate an output voltage. A feedback system generates a feedback current based on the output voltage. A mode detector generates a control current associated with the output current based on the feedback current and selects between a pulse-width modulation (PWM) mode and a pulse mode based on an amplitude of the control current. The PWM mode is associated with a sequential on-time and off-time of the at least one power switch, and the pulse mode is associated with adding an idle time between the on-time and the off-time of the at least one power switch based on the switching signal. A gate driver system generates the switching signal based on the mode.

Another example includes a method for controlling a power supply system. The method includes generating at least one switching signal based on an amplitude of an output current and controlling activation of at least one power switch to generate the output current based on an input voltage and in response to the respective at least one switching signal to generate an output voltage. The method also includes generating a control current based on a feedback current that is associated with the output voltage. The method further includes comparing the control current to at least one predetermined threshold to select between a pulse-width modulation (PWM) mode and a pulse mode for operation of the power supply system based on the amplitude of the control current. The PWM mode can be associated with a sequential on-time and off-time of the at least one power switch and the pulse mode being associated with an idle time between the on-time and the off-time of the at least one power switch. The method further includes setting a duration of the idle time in the pulse mode based on the amplitude of the control current, wherein generating the at least one switching signal comprises adding the idle time between the on-time and the off-time of the at least one power switch based on the at least one switching signal in the pulse-mode.

Another example includes an integrated circuit (IC) chip comprising a power supply system. The power supply system includes a switch system comprising at least one power switch coupled to an output and a feedback system coupled to the output. The power supply system also includes a mode detector comprising current mirrors coupled to the feedback system and mode inverters. The power supply system further includes a gate driver system interconnecting the mode inverters and the switch system, and a timing circuit coupled to the gate driver system and one of the mode inverters.

DETAILED DESCRIPTION

This disclosure relates generally to electronic systems, and more specifically to a power supply system with pulse mode operation. The power supply system can be configured, for example, as a boost power supply system that implements discontinuous conduction mode (DCM). The power supply system can include a switch system that includes at least one power switch that is configured to conduct an output current through an inductor based on alternate activation and deactivation of the power switch(es) in response to a respective at least one switching signal. The output current can thus generate an output voltage.

The switching signal(s) can be generated by a gate driver system that can generate the switching signal(s) based on a feedback current. The feedback current can have an amplitude that is based on the amplitude of the output voltage. The feedback current can be provided, for example, to a mode detector that is configured to generate a control current based on the feedback current and which is associated with the output current. For example, the control current can be generated via a replica transistor device that is substantially similar (e.g., fabrication matched) to one of the power switch(es). The mode detector can thus select an operating mode based on an amplitude of the control current. As an example, the mode detector can compare the amplitude of the control current with at least one predetermined threshold, such as a skip mode threshold and a pulse mode threshold, to select one of a pulse-width modulation (PWM) mode, a pulse mode, or a skip mode.

For example, the skip mode can be based on the control current having an amplitude that is less than a threshold and can correspond to deactivation of the power switch(es), such that the output voltage is generated based on discharging an output capacitor. The pulse mode can correspond, for example, to a pulse frequency mode for a quasi-constant frequency converter (e.g., constant on-time or constant off-time converter), or can correspond to a pulse skip mode for a fixed-frequency converter. In the pulse mode, the mode detector can set an idle time duration based on the control current (e.g., based on the amplitude of the control current relative to the pulse mode threshold), such that the gate driver system can generate the switching signal(s) in the pulse mode to include the idle time between the off-time and the on-time of the power switch(es). Therefore, the power supply system can operate efficiently with a low ripple output voltage, as described in greater detail herein.

Figure 1:
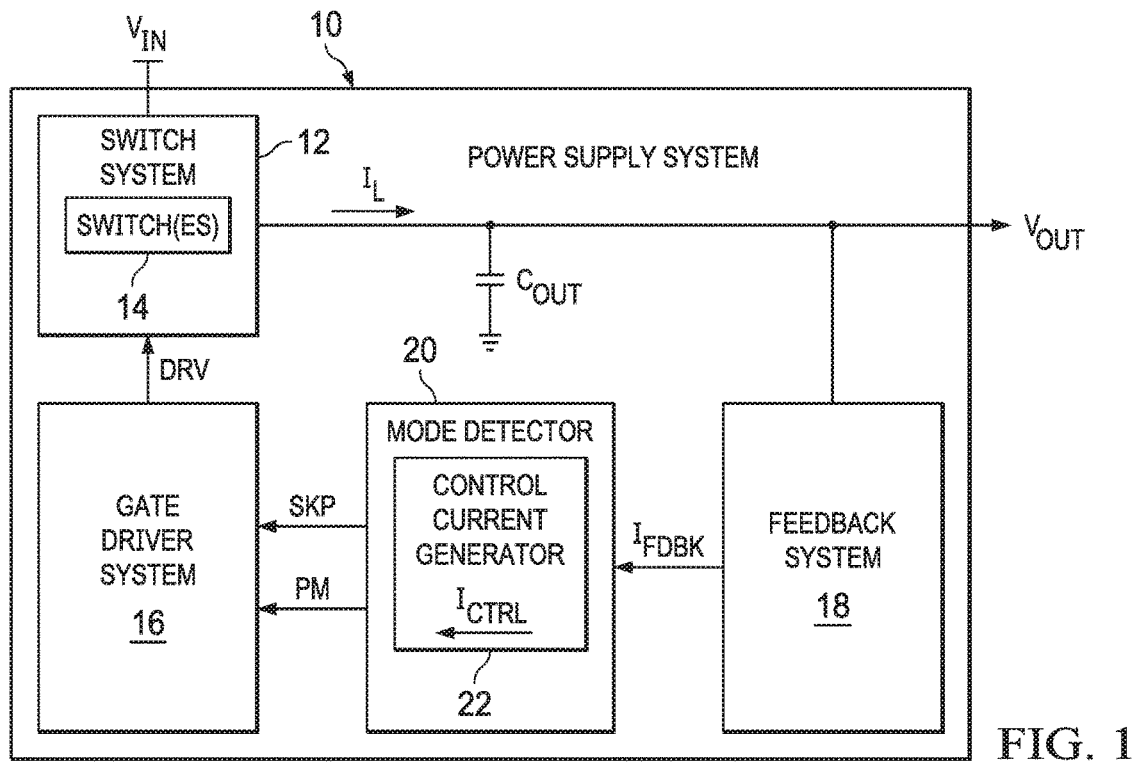
FIG. 1 illustrates an example of a power supply system.

FIG. 1 illustrates an example of a power supply system 10. The power supply system 10 can be implemented, for example, as a boost power supply system that is configured to generate an output voltage $V_{OUT}$ based on an input voltage $V_{IN}$. The power supply system 10 can be implemented in any of a variety of power providing applications, such as to provide power in a portable electronic device (e.g., a laptop or tablet computer, a smartphone, or any of a variety of other electronic devices). As an example, the power supply system 10 can operate in a discontinuous conduction mode (DCM), as described in greater detail herein.

The power supply system 10 include a switch system 12 that includes at least one power switch ("SWITCH(ES)") 14 that is activated and deactivated in response to a respective at least one switching signal DRV to provide an output current $I_L$ that can be provided via an inductor (not shown). For example, the power switch(es) 14 can be arranged as a high-side switch and a low-side switch that are alternately activated and deactivated to provide the output current $I_L$ through the inductor. The output current $I_L$ is provided across an output capacitor $C_{OUT}$ to generate the output voltage $V_{OUT}$. In the example of FIG. 1, the switching signal(s) DRV are generated by a gate driver system 16. The power supply system 10 also includes a feedback system 18 that is configured to generate a feedback current $I_{FDBK}$ that is based on the output voltage $V_{OUT}$.

The power supply system 10 also includes a mode detector 20 that is configured to select an operating mode of the power supply system 10, as described in greater detail herein, based on the feedback current $I_{FDBK}$. The mode detector 20 includes a control current generator 22 that is configured to generate a control current $I_{CTRL}$ that can be generated based on the feedback current $I_{FDBK}$. As described in greater detail herein, the control current $I_{CTRL}$ can be implemented for mode control of the power supply system 10. In addition, the control current $I_{CTRL}$ can be provided to generate a switching current $I_{SW}$ that provides switching control of the switch system 12. For example, the control current generator 22 can include a replica transistor device that is substantially similar (e.g., fabrication matched) to one of the power switch(es). As described herein, the term "fabrication matched" can describe circuit devices that are fabricated to be substantially identical with respect to fabrication conditions (e.g., on a same portion of a die/wafer), such that the fabrication matched components can be substantially identical with respect to process and temperature variations. Therefore, the switching current $I_{SW}$ can be substantially similar (e.g., identical or proportional) to the output current $I_L$ to a given threshold current amplitude.

The mode detector 20 is thus configured to compare the control current $I_{CTRL}$ with one or more predetermined thresholds to select an operating mode of the power supply system 10. For example, the operating modes can include a pulse-width modulation (PWM) mode corresponding to sequential on-time and off-time of the power switch(es) 14, such as during typical normal load operation of the power supply system 10, based on a duty-cycle. The operating modes can also include a skip mode corresponding to deactivation of the power switch(es) 14, such that the amplitude of the output voltage $V_{OUT}$ is maintained based on discharging the output capacitor $C_{OUT}$. The operating modes can further include a pulse mode corresponding to an idle time between the off-time and the on-time of the power switch(es) 14. As an example, the gate driver system 16 can set the duration of the idle time based on an idle current $I_{IDLE}$ generated by the mode detector 20, with the idle current $I_{IDLE}$ having an amplitude that is based on the amplitude of the control current $I_{CTRL}$ relative to the predetermined threshold (e.g., a predetermined pulse threshold). Thus, the gate driver system 16 can generate the switching signal(s) DRV such that the idle time is added to provide the idle time in the switching of the switch(es) 14.

Figure 2:
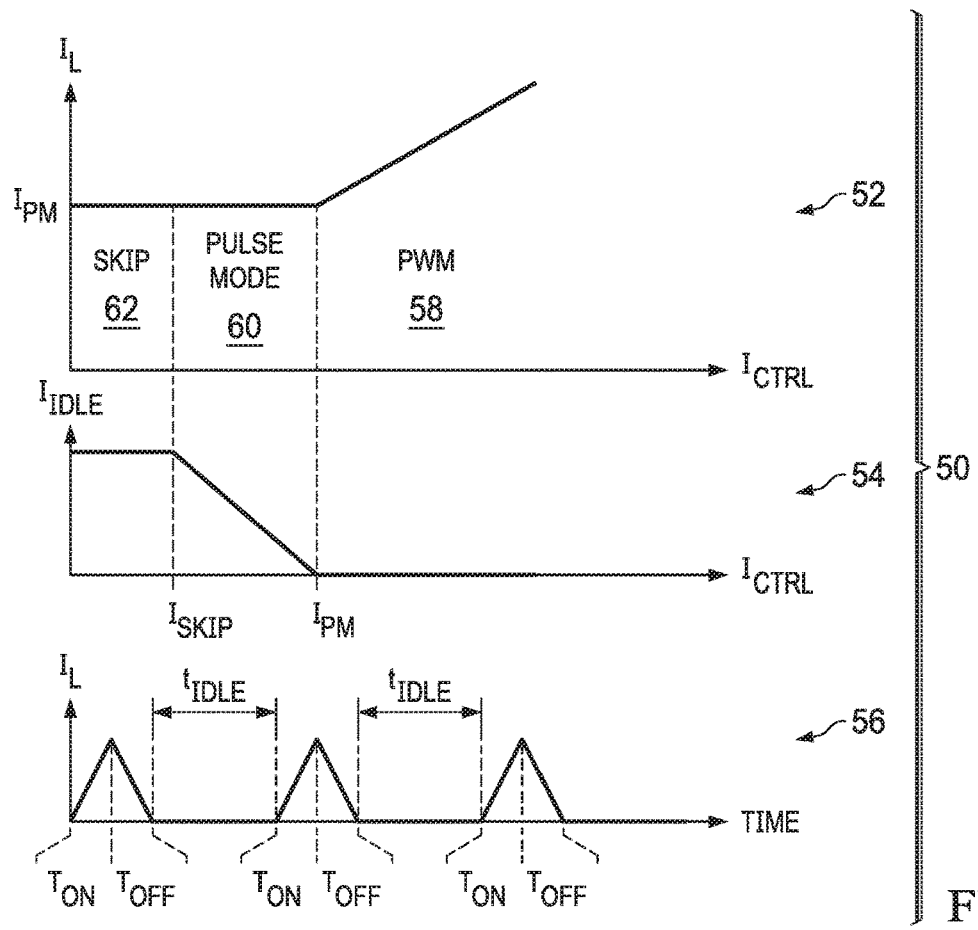
FIG. 2 illustrates an example diagram of mode selection.

FIG. 2 illustrates an example diagram 50 of mode selection. The diagram 50 includes a first graph 52 of the output current $I_L$ plotted as a function of the control current $I_{CTRL}$. The diagram 50 also includes a second graph 54 of the idle current $I_{IDLE}$ plotted as a function of the control current $I_{CTRL}$. The diagram 50 further includes a timing diagram 56 that demonstrates the output current $I_L$ as a function of time. The diagram 50 can correspond to operation of the power supply system 10. Therefore, reference is to be made to the example of FIG. 1 in the following description of the example of FIG. 2.

The first and second graphs 52 and 54 demonstrate the amplitude of the control current $I_{CTRL}$ as defining the operating mode of the power supply system 10. In the example of FIG. 2, in the first graph 52, the power supply system 10 operates in the PWM mode, demonstrated at 58, at a range of amplitudes greater than a pulse threshold amplitude $I_{PM}$. In response to the control current $I_{CTRL}$ decreasing in amplitude less than the pulse threshold amplitude $I_{PM}$, but remaining greater than a skip threshold amplitude $I_{SKP}$, the power supply system 10 switches to the pulse mode, demonstrated at 60. In addition, the output current $I_L$ has a maximum threshold amplitude, demonstrated as the pulse threshold $I_{PM}$. In response to the control current $I_{CTRL}$ decreasing in amplitude less than the skip threshold amplitude $I_{SKP}$, the power supply system 10 switches to the skip mode.

In the second graph 54, the idle current $I_{IDLE}$ is demonstrated as having an amplitude that is based on the amplitude of the control current $I_{CTRL}$ relative to the threshold amplitudes $I_{PM}$ and $I_{SKP}$. In the PWM mode 58, the idle current $I_{IDLE}$ has an amplitude of approximately zero, and thus provides no idle time between the off-time and the on-time of the switch(es) 14. However, in the pulse mode 60, the idle current $I_{IDLE}$ has an amplitude that is based on a difference between the control current $I_{CTRL}$ and the pulse threshold amplitude $I_{PM}$, such that the idle current $I_{IDLE}$ can have an amplitude that is approximately equal to a difference between the pulse threshold amplitude $I_{PM}$ and the control current $I_{CTRL}$. In the skip mode 62, the idle current $I_{IDLE}$ can remain substantially constant.

As described previously, in the pulse mode, the mode detector 20 sets a duration of the idle time, demonstrated in the example of FIG. 2 as a time $t_{IDLE}$, based on the amplitude of the idle current $I_{IDLE}$. Therefore, the idle time $t_{IDLE}$ can be proportional to the amplitude of the idle current $I_{IDLE}$, and thus inversely proportional to the amplitude of the control current $I_{CTRL}$, in the pulse mode. As an example, the mode detector 20 can generate the idle current $I_{IDLE}$, and can provide the idle current $I_{IDLE}$ to timing logic associated with the gate driver circuit 16, such that the gate driver circuit 16 can set the duration of the idle time $t_{IDLE}$. The idle time $t_{IDLE}$ can thus correspond to a time between the off-time and the on-time of the switch(es) 14, as set by the gate driver circuit 16.

In the example of FIG. 2, the timing diagram 56 corresponds to operation of the power supply system 10 in the pulse mode 60. The timing diagram 56 demonstrates pulses of the output current $I_L$ separated by the idle time $t_{IDLE}$. For example, during an on-time $T_{ON}$ of the switch(es) 14, the output current $I_L$ increases approximately linearly, such as in response to a low-side switch activating to conduct the output current $I_L$ through an inductor and through the low-side switch to ground. During an off-time $T_{OFF}$ of the switch(es) 14, such as in response to deactivation of the low-side switch and activation of a high-side switch to provide the output current $I_L$ to the output capacitor $C_{OUT}$, the output current $I_L$ decreases approximately linearly back to approximately zero. Thus, in the example of FIG. 2, the idle time $t_{IDLE}$ has been inserted by the gate driver system 16 between the off-time $T_{OFF}$ of a given pulse of the output current $I_L$ and the on-time $T_{ON}$ of the next pulse of the output current $I_L$. The duration of the idle time $t_{IDLE}$ can thus be based on the amplitude of the idle current $I_{IDLE}$, which can change based on changes in the load conditions of the power supply system 10.

For example, the power supply system 10 can be configured as a constant off-time converter, such that the idle time $t_{IDLE}$ is added after the off-time $T_{OFF}$ of the switch(es) 14 by the gate driver system 16 in the pulse mode. As another example, the power supply system 10 can be configured as a constant on-time converter, such that the idle time is added prior to the on-time $T_{ON}$ of the switch(es) 14 by the gate driver system 16 in the pulse mode. Thus, the example of FIG. 2 demonstrates the addition of the idle time $t_{IDLE}$ between the off-time $T_{OFF}$ and the on-time $T_{ON}$ of the switch(es) 14 in the pulse mode, such as for a quasi-constant frequency power supply system 10.

Figure 3:
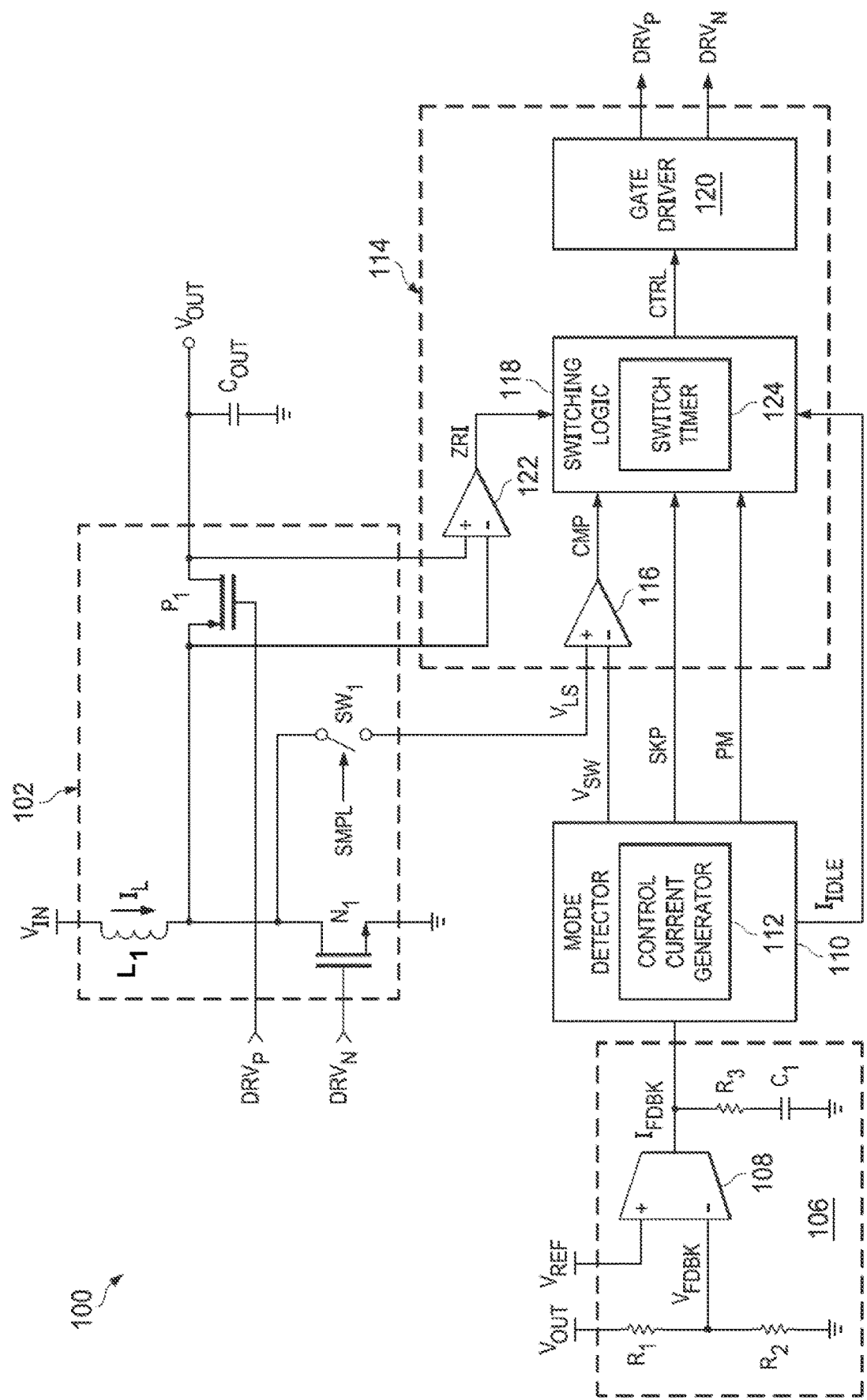
FIG. 3 illustrates an example of a power supply circuit.

FIG. 3 illustrates an example of a power supply circuit 100. The power supply circuit 100 can correspond to an example circuit of the power supply system 10 in the example of FIG. 1. For example, the power supply circuit 100 can correspond to a constant off-time quasi-constant frequency converter. Therefore, reference is to be made to the examples of FIGS. 1 and 2 in the following description of the example of FIG. 3.

The power supply circuit 100 include a switch system 102 that includes a high-side switch, demonstrated in the example of FIG. 3 as a P-channel field-effect transistor (P-FET) device $P_1$, and a low-side switch, demonstrated in the example of FIG. 3 as an N-channel field-effect transistor (N-FET) device $N_1$. The switch system 102 also includes an inductor $L_1$ that is configured to conduct the output current $I_L$. The P-FET $P_1$ is controlled by a first switching signal $DRV_P$ and the N-FET $N_1$ is controlled by a second switching signal $DRV_N$, such that the P-FET $P_1$ and the N-FET $N_1$ can be alternately activated via the switching signals $DRV_P$ and $DRV_N$, respectively, to conduct the output current $I_L$ through the inductor $L_1$ to provide the output voltage $V_{OUT}$ across the output capacitor $C_{OUT}$.

The power supply circuit 100 also includes a feedback system 106 that is configured to generate a feedback current $I_{FDBK}$ that is based on the output voltage $V_{OUT}$. In the example of FIG. 3, the feedback system 106 includes a voltage-divider formed by a first resistor $R_1$ and a second resistor $R_2$ to provide a feedback voltage $V_{FDBK}$. The feedback voltage $V_{FDBK}$ and a reference voltage $V_{REF}$ are provided to a transconductance amplifier 108 to provide the feedback current $I_{FDBK}$ across a loop compensation network formed by a resistor $R_3$ and a capacitor $C_1$ interconnecting the feedback current $I_{FDBK}$ and a low-voltage rail (e.g., ground).

The feedback current $I_{FDBK}$ is provided to a mode detector 110 that is configured to select an operating mode of the power supply circuit 100, for example, similar to as described in the example of FIG. 2, based on the feedback current $I_{FDBK}$. The mode detector 110 includes a control current generator 112 that is configured to generate a control current $I_{CTRL}$ that can be associated with the output current $I_L$ and which is generated based on the feedback current $I_{FDBK}$. For example, the control current generator 112 can include a replica transistor device that is substantially similar (e.g., fabrication matched) to one of the power switch(es). Therefore, the control current $I_{CTRL}$ can be substantially similar (e.g., identical or proportional) to the output current $I_L$ to a given threshold current amplitude, such as described in the example of FIG. 2.

Figure 4:
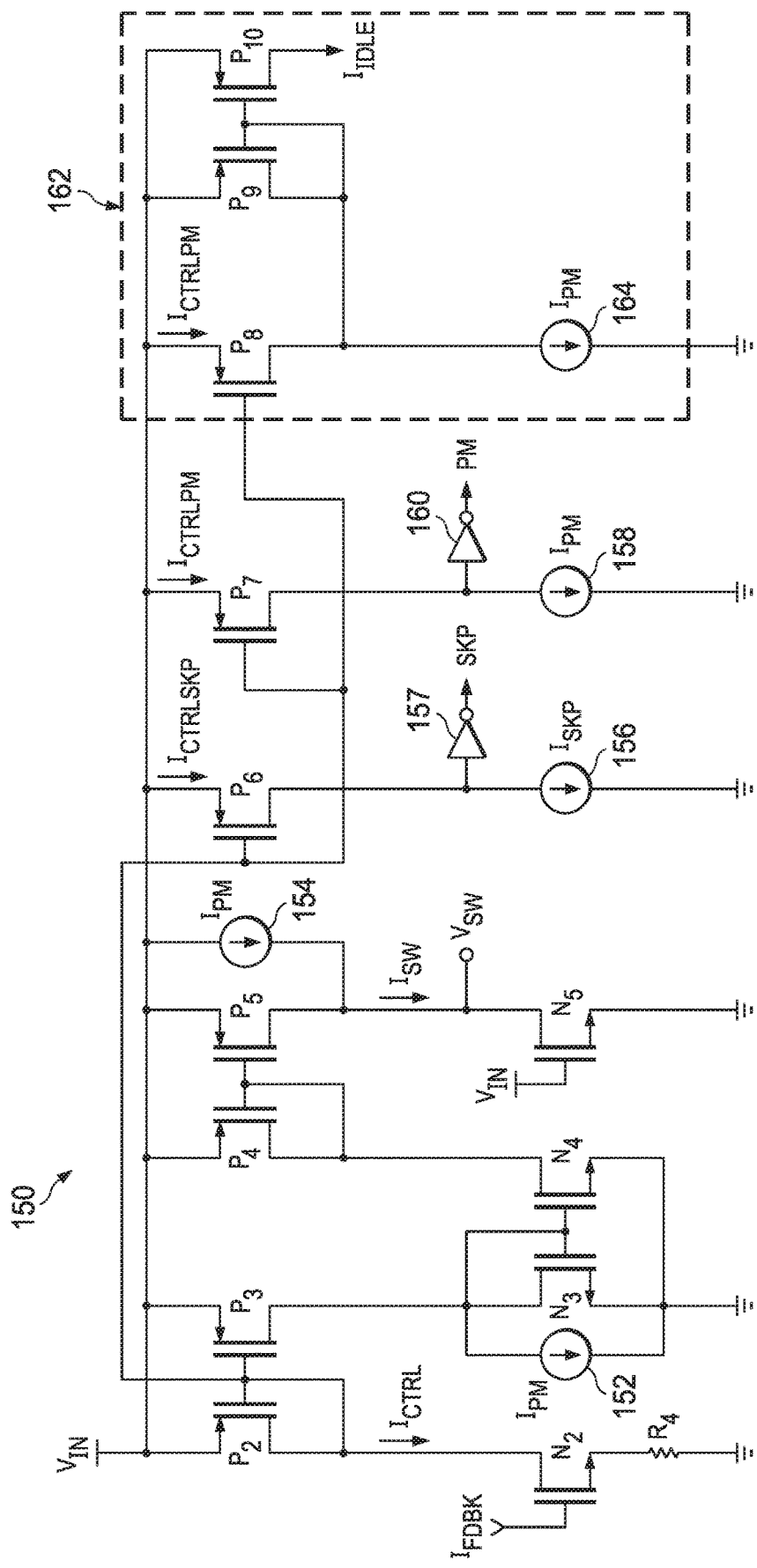
FIG. 4 illustrates an example of a mode detector.

FIG. 4 illustrates an example of a mode detector 150. The mode detector 150 is demonstrated in the example of FIG. 4 as a circuit that can correspond, for example, to the mode detector 20 in the example of FIG. 1 or the mode detector 110 in the example of FIG. 3. Therefore, reference is to be made to the examples of FIGS. 1-3 in the following description of the examples of FIG. 4.

The mode detector 150 includes a current source formed by a P-FET $P_2$ and an N-FET $N_2$. The P-FET $P_2$ is demonstrated as diode-connected between the input voltage $V_{IN}$ and the N-FET $N_2$, and the N-FET $N_2$ is controlled by the feedback current $I_{FDBK}$. Therefore, the control current $I_{CTRL}$ is generated to flow through the P-FET $P_2$, the N-FET $N_2$, and a resistor $R_4$. The mode detector 150 also includes a plurality of current mirrors that are configured to mirror the control current $I_{CTRL}$. The current mirrors include a first current mirror that includes a P-FET $P_3$ and an N-FET $N_3$ that is arranged in parallel with a current source 152 that is configured to conduct the pulse threshold current $I_{PM}$.

The first current mirror is coupled to a diode-connected P-FET $P_4$ in series with an N-FET $N_4$ that are arranged between the input voltage $V_{IN}$ and the low-voltage rail (e.g., ground) and which are arranged with respect to a second current mirror formed by a P-FET $P_5$ that is arranged in parallel with a current source 154 that is configured to conduct the pulse threshold current $I_{PM}$ and an N-FET $N_5$. The N-FET $N_5$ is held in an activated state based on coupling the gate to the input voltage $V_{IN}$. The P-FET $P_5$ and the N-FET $N_5$ are collectively configured to conduct the switching current $I_{SW}$ to generate a switching voltage $V_{SW}$. As an example, the N-FET $N_5$ can be a replica transistor device that is a substantial replica (e.g., fabrication matched) to the low-side N-FET $N_1$, such that the switching current $I_{SW}$ can be associated with the output current $I_L$ (e.g., above the threshold amplitude $I_{TH}$), such as at a given proportion (e.g. several orders of magnitude). In addition, because the pulse threshold current $I_{PM}$ is arranged in parallel with the N-FET $N_3$ and the P-FET $P_5$, the switching current $I_{SW}$ is clamped to the minimum amplitude of the pulse threshold current $I_{PM}$ in response to an amplitude of the control current $I_{CTRL}$ that is less than the pulse threshold current $I_{PM}$.

The current mirrors also include a third current mirror that is coupled to the current source of the P-FET $P_2$ and the N-FET $N_2$. The third current mirror includes a P-FET $P_6$ that conducts a current $I_{CTRLSKP}$ and a current source 156 that conducts the skip threshold $I_{SKP}$. The current $I_{CTRLSKP}$ can be approximately equal to the control current $I_{CTRL}$. Therefore, in response to the control current $I_{CTRL}$ being less than the amplitude of the skip threshold $I_{SKP}$, an inverter 157 can generate a skip signal SKP to indicate that the power supply circuit 100 is to operate in the skip mode. Similarly, the current mirrors also include a fourth current mirror that includes a P-FET $P_7$ that conducts a current $I_{CTRLPM}$ and a current source 158 that conducts the pulse threshold $I_{PM}$. The current $I_{CTRLPM}$ can be approximately equal to the control current $I_{CTRL}$. Therefore, in response to the control current $I_{CTRL}$ being less than the amplitude of the pulse threshold $I_{PM}$, an inverter 160 can generate a pulse signal PM to indicate that the power supply circuit 100 is to operate in the pulse mode.

The current mirrors also include a differential current mirror 162 that includes a P-FET $P_8$ that likewise conducts the current $I_{CTRLPM}$ and a current source 164 that conducts the pulse threshold $I_{PM}$. The differential current mirror 162 also includes a diode-connected P-FET $P_9$ and a P-FET $P_{10}$ that have gates coupled to the drain of the P-FET $P_8$ and which are arranged as current mirrors with respect to each other. Therefore, the P-FET $P_{10}$ generates the idle current $I_{IDLE}$ at a drain, with the idle current $I_{IDLE}$ being a difference between the amplitude of the current $I_{CTRLPM}$ (and thus the control current $I_{CTRL}$) and the pulse threshold $I_{PM}$. The differential current mirror 162 can thus generate the idle current $I_{IDLE}$ in a manner that can set the duration of the time $t_{IDLE}$ proportional to the control current $I_{CTRL}$, and thus based on the feedback current $I_{FDBK}$ as a function of the output voltage $V_{OUT}$. Accordingly, the power supply circuit 100 can control light load operation in an efficient manner while mitigating ripple associated with the output voltage $V_{OUT}$.

Referring back to the example of FIG. 3, the power supply circuit 100 further includes a gate driver system 114 that includes a first comparator 116, a switching logic 118, a gate driver 120, and a second comparator 122. The mode detector 110 provides the switching voltage $V_{SW}$ to an inverting input of the first comparator 116. Additionally, a voltage $V_{LS}$ that is associated with the voltage across the low-side switch N-FET $N_1$ via a switch $SW_1$ is provided to the non-inverting input of the first comparator 116. In the example of FIG. 3, the switch $SW_1$ is controlled by a signal SMPL. Therefore, the first comparator 116 provides a logic comparison signal CMP based on the comparison. In addition, the mode detector 110 provides the skip signal SKP and the pulse mode signal PM as logic outputs to indicate the mode of the power supply circuit 100. Furthermore, the mode detector 110 provides the idle current $I_{IDLE}$ as an output.

The switching logic 118 is configured to receive the logic comparison signal CMP, the skip mode signal SKP, the pulse mode signal PM, and the idle current $I_{IDLE}$ as inputs to generate one or more control signals CTRL. In addition, the second comparator 122 provides a comparison signal ZRI to the switching logic 118 to detect zero-current across the high-side switch P-FET $P_1$. The control signal(s) CTRL are provided to the gate driver 120 to generate the switching signals $DRV_P$ and $DRV_N$. In the example of FIG. 3, the switching logic 118 includes a switch timer 124 that is configured to calculate the idle time $t_{ILDLE}$ based on the amplitude of the idle current $I_{IDLE}$, similar to as described previously in the example of FIG. 2. Therefore, the control signal(s) CTRL can be provided to the gate driver 120 to generate the switching signals $DRV_P$ and $DRV_N$ to include the idle time $t_{IDLE}$ between the off-time $T_{OFF}$ corresponding to deactivation of the high-side switch P-FET $P_1$ and the on-time $T_{ON}$ corresponding to the activation of the low-side switch N-FET $N_1$. It is to be understood that, while the power supply circuit 100 is demonstrated as a peak current constant off-time quasi-constant frequency converter, the idle time control can apply similarly to a valley current constant on-time quasi constant frequency converter. Similarly, the idle time control can apply similarly for a fixed-frequency converter, as provided in the example of FIG. 5.

Figure 5:
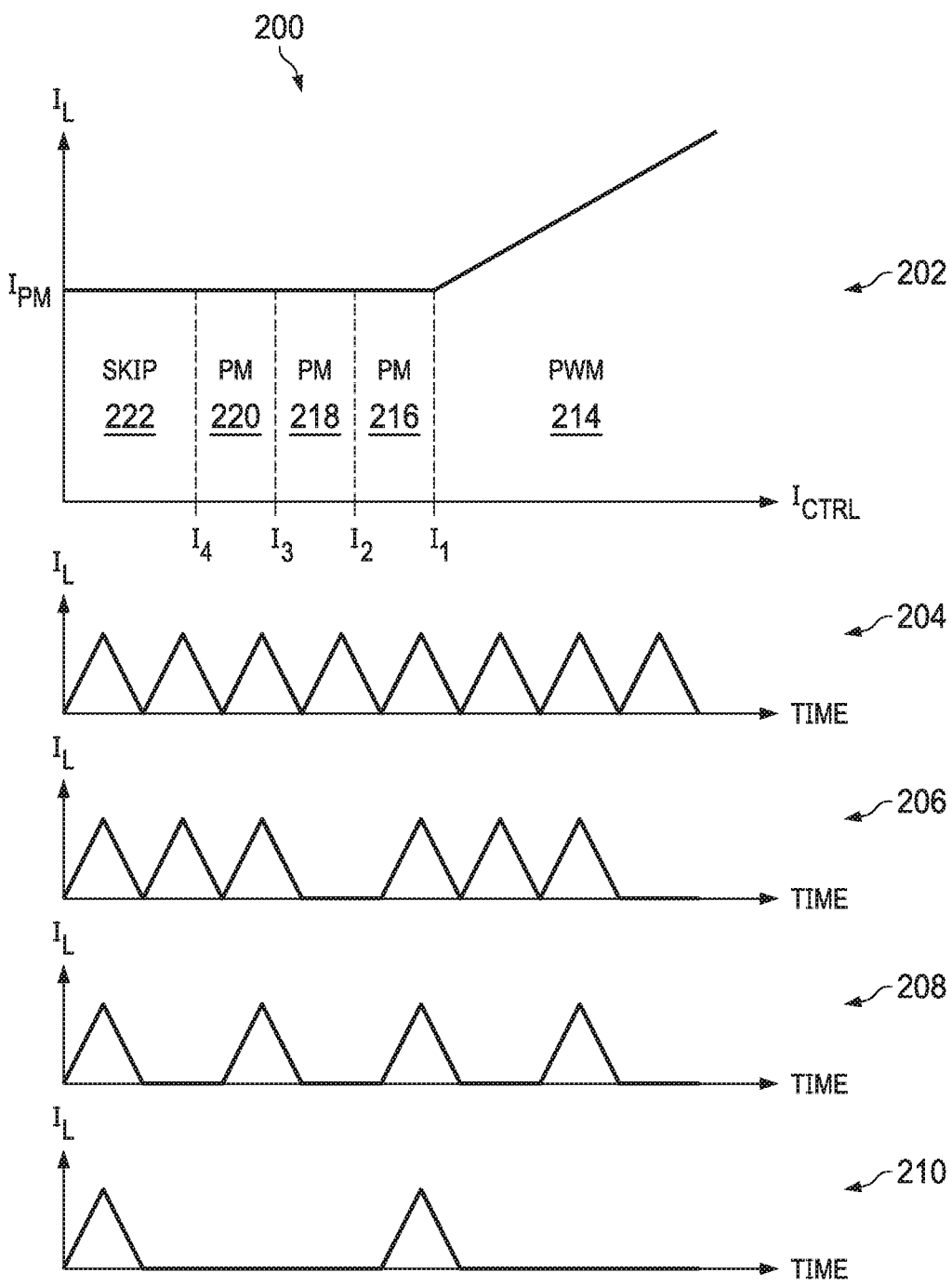
FIG. 5 illustrates another example diagram of mode selection.

FIG. 5 illustrates another example diagram 200 of mode selection. The diagram 200 includes a first graph 202 of the output current $I_L$ plotted as a function of the control current $I_{CTRL}$. The diagram 200 further includes a first timing diagram 204, a second timing diagram 206, a third timing diagram 208, and a fourth timing diagram 210 that each demonstrate the output current $I_L$ as a function of time. The diagram 200 can correspond to operation of the power supply system 10 or the power supply circuit 100. Therefore, reference is to be made to the examples of FIGS. 1-4 in the following description of the example of FIG. 5.

The first graph 202 demonstrates the amplitude of the control current ICTRL as defining the operating mode of the power supply circuit 100, similar to as demonstrated in the example of FIG. 2. However, as described in greater detail herein, the example diagram 200 demonstrates a plurality of different thresholds to define the pulse mode. In the example of FIG. 5, in the first graph 202, the power supply circuit 100 operates in the PWM mode, demonstrated at 214, at a range of amplitudes greater than a first pulse threshold amplitude I1. The PWM mode 214 is demonstrated in the first timing diagram 204, in which there is no idle time between the off-time and the on-time of the activation and deactivation of the switches P-FET P1 and N-FET N1.

In response to the control current $I_{CTRL}$ decreasing in amplitude less than the first pulse threshold amplitude $I_1$, but remaining greater than a second pulse threshold amplitude $I_2$, the power supply circuit 100 switches to a first pulse skip mode, demonstrated at 216. The first pulse skip mode 216 is demonstrated by the second timing diagram 206. In the second timing diagram 206, the idle time is demonstrated by one period length of the activation and deactivation of the switches P-FET $P_1$ and N-FET $N_1$ being omitted per four periods of the sequential pulses of the output current $I_L$. Therefore, one period length corresponds to a single sequential pulse of the output current $I_L$. As a result, the gate driver 120 deactivates the switches P-FET $P_1$ and N-FET $N_1$ for a single period for every four periods.

In response to the control current $I_{CTRL}$ decreasing in amplitude less than the second pulse threshold amplitude $I_2$, but remaining greater than a third pulse threshold amplitude $I_3$, the power supply circuit 100 switches to a second pulse skip mode, demonstrated at 218. The second pulse skip mode 218 is demonstrated by the third timing diagram 208. In the third timing diagram 208, the idle time is demonstrated by two separate non-sequential period lengths of the activation and deactivation of the switches P-FET $P_1$ and N-FET $N_1$ being omitted per four periods of the sequential pulses of the output current $I_L$ (e.g., every other period length being omitted). As a result, the gate driver 120 deactivates the switches P-FET $P_1$ and N-FET $N_1$ for two periods for every four periods non-sequentially.

In response to the control current $I_{CTRL}$ decreasing in amplitude less than the third pulse threshold amplitude $I_3$, but remaining greater than a fourth pulse threshold amplitude $I_4$, the power supply circuit 100 switches to a third pulse skip mode, demonstrated at 220. The third pulse skip mode 220 is demonstrated by the fourth timing diagram 210. In the fourth timing diagram 210, the idle time is demonstrated by three period lengths of the activation and deactivation of the switches P-FET $P_1$ and N-FET $N_1$ being omitted per four periods of the sequential pulses of the output current $I_L$. As a result, the gate driver 120 deactivates the switches P-FET $P_1$ and N-FET $N_1$ for three out of every four periods. In response to the control current $I_{CTRL}$ decreasing in amplitude less than the fourth pulse threshold amplitude $I_4$, the power supply circuit 100 switches to the skip mode, demonstrated at 222. Thus, the example of FIG. 5 demonstrates that the idle time $t_{IDLE}$ is not an analog duration of time based on the amplitude of the idle current $I_{IDLE}$, as in the example of FIG. 2, but instead corresponds to a number of the sequential current pulses of the output current $I_L$ that are skipped in each of a given set of switching periods (e.g., four) in a fixed frequency converter.

Figure 6:
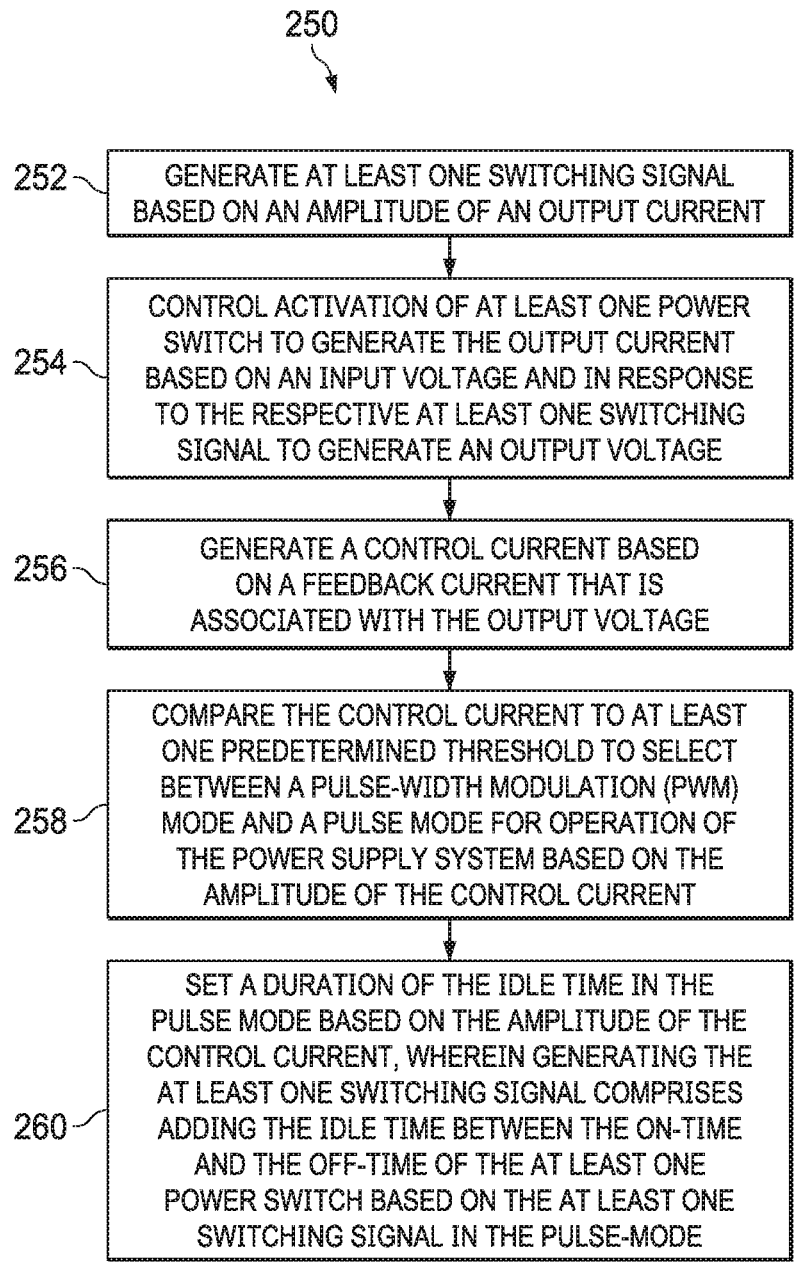
FIG. 6 illustrates an example of a method controlling a power supply system.

In view of the foregoing structural and functional features described above, a methodology in accordance with various aspects of the present invention will be better appreciated with reference to FIG. 6. While, for purposes of simplicity of explanation, the methodology of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 6 illustrates an example of a method 250 for controlling a power supply system (e.g., the power supply system 10). At 252, at least one switching signal (e.g., the switching signal(s) DRV) is generated based on an amplitude of an output current (e.g., the output current $I_L$). At 254, activation of at least one power switch (e.g., the switch(es) 14) to generate the output current is controlled based on an input voltage (e.g., the input voltage $V_{IN}$) and in response to the respective at least one switching signal to generate an output voltage (e.g., the output voltage $V_{OUT}$). At 256, a control current (e.g., the control current $I_{CTRL}$) is generated based on a feedback current (e.g., the feedback current $I_{FDBK}$) that is associated with the output voltage. At 258, the control current is compared to at least one predetermined threshold (e.g., the pulse mode threshold $I_{PM}$) to select between a PWM mode and a pulse mode for operation of the power supply system based on the amplitude of the control current. The PWM mode can be associated with a sequential on-time and off-time of the at least one power switch and the pulse mode being associated with an idle time (e.g., the idle time $t_{IDLE}$) between the on-time and the off-time of the at least one power switch. At 260, a duration of the idle time is set in the pulse mode based on the amplitude of the control current. Generating the at least one switching signal can include adding the idle time between the on-time and the off-time of the at least one power switch based on the at least one switching signal in the pulse-mode.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A power supply system comprising: a reference voltage input; a switch system having a voltage input, a voltage output, and including a power switch coupled between the voltage input and the voltage output, the power switch having a switching signal input; a feedback system having an input coupled to the voltage output, an input coupled to the reference voltage input, and a feedback current output; a mode detector having an input coupled to the voltage input, an input coupled to the feedback current output, a switching voltage output, a skip mode output, a pulse mode output, and an idle current output; a gate driver system having an input coupled to the switching voltage output, an input coupled to the skip mode output, an input coupled to the pulse mode output, an input coupled to the idle current output, and a switching signal output coupled to the switching signal inputs in which the mode detector is configured to: select between a PWM mode and a pulse mode based on an amplitude of a control current relative to a predetermined threshold current; and set a duration of an idle time based on an amplitude difference between the control current and the predetermined threshold current; and in which the mode detector includes: a current source configured to generate the control current based on the feedback current output; a first current mirror configured to mirror a first current to generate a switching current through a replica switch that is fabrication matched with respect to at least one power switch, the switching current being provided to the gate driver system to generate at least one switching signal; a second current mirror configured to mirror the control current to select between the PWM mode and the pulse mode based on the amplitude of the control current relative to the predetermined threshold current; and a current difference mirror configured to generate the idle current output that is the amplitude difference between the control current and the predetermined threshold current; in which the gate driver system is configured to set a duration of the idle time proportional to the amplitude of the idle current.

2. The power supply system of claim 1 in which the power switch is a first power switch and the switch system includes:
   an inductor coupled between the voltage input and the first power switch; and
   a second power switch coupled between the inductor and a ground rail and having a second switching signal input.

3. The power supply system of claim 1 in which the feedback system includes transconductance amplifier circuitry having an input coupled to the reference voltage input, an input coupled to the voltage output, and the feedback current output.

4. The power supply system of claim 1 in which the gate driver system includes a first comparator having a first input coupled to the switching voltage output, having a second input selectively coupled to the voltage input, and having a first compare output.

5. The power supply system of claim 4 including a switch having one terminal coupled to the voltage input and another terminal coupled to the second input of the first comparator.

6. The power supply system of claim 4 in which the gate driver system includes a second comparator having an input on one side of the power switch, an input on another side of the power switch and having a zero crossing output.

7. The power supply system of claim 6 in which the gate driver system includes switching logic having inputs coupled to the zero crossing output, the first compare output, the skip mode output, the pulse mode output, and the idle current output, and having a control output.

8. The power supply system of claim 7 in which the gate driver system includes gate driver circuitry having a control input coupled to the control output and having the switching signal output coupled to the switching signal input.

9. The power supply system of claim 1 in which the feedback system includes transconductance amplifier circuitry having an input coupled to the reference voltage input, an input coupled to the voltage output, and the feedback current output.

10. The power supply system of claim 1, in which the mode detector is configured to provide at least one mode command signal associated with the PWM mode, the pulse mode, and a skip mode based on the amplitude of the control current.

11. The power supply system of claim 10 in which the skip mode is associated with deactivation of at least one power switch to maintain the output-voltage output based on discharging an output capacitor.

12. The power supply system of claim 1 in which the power supply system is configured as a constant off-time converter, such that the idle time is added after an off-time of at least one power switch in the pulse mode.

13. The power supply system of claim 1 in which the power supply system is configured as a constant on-time converter, such that the idle time is added prior to an on-time of at least one power switch in the pulse mode.

14. A process for controlling a power supply system comprising: activating a power switch in response to a switching signal to produce an output voltage from an input voltage; generating a feedback current in response to the output voltage and in response to a reference voltage; comparing the feedback current to a threshold current and producing one of a pulse-width modulation (PWM) mode signal and a pulse mode signal in response to an amplitude of the feedback current, the producing including producing an idle time current; setting a duration of an idle time in the idle time current in response to the amplitude of the feedback current; and generating the switching signal to the power switch in response to the idle time current, the generating the switching signal including adding the idle time between an on-time and an off-time of the power switch; generating a mode command signal associated with a PWM mode, a pulse mode, and a skip mode based on an amplitude of a control current; deactivating at least one power switch to maintain the output voltage based on discharging an output capacitor; in which the generating the control current includes providing the feedback current to a mode detector, the mode detector including: a current source configured to generate the control current based on the feedback current; a first current mirror configured to mirror a first current to generate a switching current through a replica switch that is fabrication matched with respect to at least one power switch, the switching current being provided to a gate driver to generate at least one switching signal; a second current mirror configured to mirror the control current to select between the PWM mode and the pulse mode based on the amplitude of the control current relative to a predetermined threshold current; and a current difference mirror configured to generate the idle time current that is the amplitude difference between the control current and the predetermined threshold current; in which the gate driver is configured to set a duration of the idle time proportional to the amplitude of the idle time current.

15. An integrated circuit comprising: a power supply system, the power supply system including: a reference voltage input; a switch system including a power switch having a control input and a power output, the power output being coupled to a voltage output; a feedback system coupled to the voltage output and coupled to the reference voltage input; a mode detector including current mirrors and a differential current mirror coupled to the feedback system, the differential current mirror having an idle time current output; a gate driver system having an input coupled to the idle time current output and a switching output coupled to the control input of the power switch, the gate driver system including a timing circuit coupled to the idle time current outputs in which the mode detector includes: a current source configured to generate a control current based on a feedback current; a first current mirror configured to mirror the control current to generate a switching current through a replica switch that is fabrication matched with respect to at least one power switch, the switching current being provided to the gate driver system to generate at least one switching signal; a second current mirror configured to mirror the control current to select between a PWM mode and a pulse mode based on the amplitude of the control current relative to a predetermined threshold current; and the differential current mirror configured to generate the idle time current output that is an amplitude difference between the control current and the predetermined threshold current; and in which the gate driver system is configured to set a duration of an idle time proportional to the amplitude of the idle time current output.

* * * * *